United States Patent [19]
Cannon et al.

[11] Patent Number: 6,167,408
[45] Date of Patent: Dec. 26, 2000

[54] COMPARATIVE UPDATES TRACKING TO SYNCHRONIZE LOCAL OPERATING PARAMETERS WITH CENTRALLY MAINTAINED REFERENCE PARAMETERS IN A MULTIPROCESSING SYSTEM

[75] Inventors: David Maxwell Cannon; David Romney Crockett, both of Tucson, Ariz.

[73] Assignee: International Business Machines Corporation, Armonk, N.Y.

[21] Appl. No.: 09/144,425

[22] Filed: Aug. 31, 1998

[51] Int. Cl.$^7$ ...................................................... G06F 12/00
[52] U.S. Cl. .......................... 707/203; 707/200; 707/201; 707/202
[58] Field of Search ................................ 707/9, 200–204; 709/201, 220, 221, 225, 229, 248; 713/200–202; 395/712; 712/32

[56] References Cited

U.S. PATENT DOCUMENTS

| | | | |
|---|---|---|---|
| 5,475,819 | 12/1995 | Miller et al. | 709/203 |
| 5,537,642 | 7/1996 | Glowny et al. | 713/200 |
| 5,546,595 | 8/1996 | Norman et al. | 710/10 |
| 5,606,693 | 2/1997 | Nilsen et al. | 707/10 |
| 5,652,908 | 7/1997 | Douglas et al. | 714/4 |
| 5,668,986 | 9/1997 | Nilsen et al. | 707/10 |
| 5,956,719 | 9/1999 | Kudo et al. | 707/10 |

OTHER PUBLICATIONS

Orfali et al., "essential Client/Server Survival Guide", 1994. pp. 430–474.

*Primary Examiner*—John A. Follansbee
*Assistant Examiner*—Stacy Whitmore
*Attorney, Agent, or Firm*—Dan Hubert & Assoc.

[57] ABSTRACT

In a multiprocessing system, a configuration manager maintains various reference parameters that are selectively copied by subordinate managed units to form local operating parameters, which subsequently govern operation of these managed units. A comparative technique is employed to track reference parameter updates, and synchronize each local operating parameter counterpart accordingly. At the configuration manager, reference parameters include reference profiles and reference characteristics. Each reference profile specifies one or more of the reference characteristics. At each managed unit, the operating parameters include subcribed-to profiles and operating characteristics; both are initially copied from the configuration manager's reference profiles/characteristics. Each local operating profile specifies one or more of the operating characteristics. Each managed unit operates according to its locally maintained operating characteristics. When certain update criteria are satisfied, a managed unit and the configuration manager cooperatively synchronize the manage unit's local operating profiles and characteristics with the configuration manager's reference profiles and characteristics. This involves comparing the reference and operating profiles to identify new, updated, or deleted operating characteristics. Also, the local operating profiles and operating characteristics may be cross-referenced to identify any "orphan" characteristics for deletion.

25 Claims, 8 Drawing Sheets

COMPARATIVE UPDATES TRACKING TO SYNCHRONIZE LOCAL OPERATING PARAMETERS WITH CENTRALLY MAINTAINED REFERENCE PARAMETERS IN A MULTIPROCESSING SYSTEM

CROSS-REFERENCE TO RELATED APPLICATIONS

The present application is related to co-pending U.S. application Ser. No. 09/144,424, entitled "Multiprocessing System with Automated Propagation of Changes to Centrally Maintained Configuration Settings," filed herewith, in the names of David Maxwell Cannon et al., and assigned to International Business Machines Corp. (IBM).

BACKGROUND OF THE INVENTION

1. Field of the Invention

The present invention relates to multiprocessing systems. More particularly, the invention concerns a multiprocessing system in which hierarchically superior configuration managers maintain various reference parameters that are selectively copied by subordinate managed units to form local operating parameters that subsequently guide the operation of these managed units. The invention includes a comparative technique for tracking updates to the reference parameters, and synchronizing each local operating parameter counterpart accordingly.

2. Description of the Related Art

In different forms, multiprocessing systems are in widespread use today. As one example, multiprocessing systems include "supercomputers" and other similar machines that utilize many separate high-speed processors. This arrangement is popular because, collectively, the processors provide a tremendously powerful computing engine. Multiprocessing systems also include "distributed processing systems," which use typically multiple physically distinct computing machines to cooperatively perform a task. With this arrangement a computing task that is too intensive for any one machine can be spread out and processed in smaller parts by many different machines. In addition to these examples, multiprocessing systems can include a hybrid of the two, or a variety of other arrangements with multiple computers, microprocessors, application program instances, program threads, or other processing elements.

In one popular example of distributed processing system, many servers are networked to provide a data storage system that provides users with many sophisticated data management capabilities. This arrangement may be called a distributed storage system; examples of this approach may be found in various known networks implementing the ADSTAR™ Distributed Storage Manager (ADSM)™ software of IBM. Although this and other similar systems constitute a significant advance and even enjoy widespread commercial success today, IBM continually seeks to improve the performance and efficiency of their multiprocessing systems. One area of focus concerns possible improvements to the ease and efficiency of configuring members of such multiprocessing systems.

Particularly, one drawback of the known arrangements is the time needed to individually configure each member of the multiprocessing system to operate as desired. In a system of networked servers, for example, configuration may involve a system administrator executing various configuration commands at a number of different networked servers to initially configure the servers, and thereby establish the servers' operating characteristics. In many cases, this is done by the system administrator individually logging-in to each desired server and then executing a command. In more advanced systems, the system administrator may remotely log-in to desired servers remotely via another, nearby server. In either case, when many different servers; are involved, there is a significant time penalty, since the administrator must take steps to execute each configuration command at the desired server. Moreover, this time penalty can arise repeatedly, since the same steps are required to reconfigure a server due to any updated operating requirements.

This time inefficiency presents a number of problems. First, it burdens the system administrator with work, making the system more costly to operate. As another limitation, the manual configuration and reconfiguration technique can be too error prone for some applications. In some cases, for example, many storage servers may be configured identically and distributed throughout a large office, for reasons of performance and scalability. In this situation, it is desirable to maintain the configuration of these servers in lock step, and thus all configuration changes must be universally applied to all servers. However, this is difficult and vulnerable to error due to the lengthy and repetitive entry of configuration commands at each server. Consequently, the known techniques for configuring members of a distributed processing system are not completely adequate for some applications due to certain unsolved problems.

SUMMARY OF THE INVENTION

Broadly, the present invention concerns a multiprocessing system in which hierarchically superior configuration managers maintain various reference parameters that are selectively copied by subordinate managed units to form local operating parameters that subsequently guide the operation of these managed units. The invention includes a comparative technique for tracking updates to the reference parameters, and synchronizing each local operating parameter counterpart accordingly.

The configuration manager maintains a list of reference profiles, and a list of reference characteristics. Each reference profile specifies one or more of the reference characteristics. Also in the configuration manager's storage, a subscription list names each managed unit subscribing to a reference profile, and the identity of that reference profile.

Each managed unit has a list of subscribed-o profiles and a list of operating characteristics, with each subcribed-to profile specifying one or more of the operating characteristics. To reduce network traffic and expedite update tracking, each managed unit may also maintain a local copy of the reference profiles, called a "master profile view." The operation of each managed unit is governed by its locally maintained operating characteristics.

When certain update criteria are satisfied, a managed unit and the configuration manager cooperatively synchronize the managed unit's operating characteristics with the configuration manager's reference characteristics. At this time, the managed unit's profile master view may also be synchronized with the configuration manager's list of reference profiles. The update criteria may trigger synchronization on any desired schedule of the managed unit and/or configuration manager, such as a periodic schedule, a non-periodic schedule, after a minimum number of updates occur, etc. Different managed units may have different update criteria, if desired.

To begin synchronization, the managed unit sends its list of subscribed-to profiles to the configuration manager. In an alternative embodiment, the configuration manager sends its list of reference profiles to the managed unit. Then, these two lists are compared by the configuration manager (or by the managed unit in the alternative embodiment). This comparison is performed to identify any subscribed-to profiles whose counterparts in the list of reference profiles have been updated, and may be performed, for example, by comparing version codes. Such subscribed-to profiles are referred to as "stale." It is important to identify stale subscribed-to profiles because they might not properly identify current operating characteristics that the managed unit should be operating under.

For each stale subscribed-to profile, the stale subscribed-to profile is compared to its updated counterpart reference profile. This comparison identifies any "new" reference characteristics that are specified by the reference profile without having a counterpart operating characteristic specified by the stale subscribed-to profile. This comparison also identifies any updated reference characteristics, where an older version is named by the subscribed-to profile. In addition, this comparison identifies any reference characteristics that have been deleted from the reference profile but still remain in the corresponding subscribed-o profile. For each new or updated operating characteristic, the managed unit copies the counterpart reference characteristic from the configuration manager into the managed unit's list of operating characteristics. For each deleted operating characteristic, if the deleted reference characteristic is no longer named in any other subscribed-to profile, the operating characteristic is removed from the managed unit's list of operating characteristics.

Having synchronized the managed unit's list of operating characteristics, each stale subscribed-to profile is updated to match its up-to-date reference profile counterpart. This may be done, for example, by giving the subscribed-to profile the reference profile's version code. To complete synchronization, the managed unit's profile master view is updated to match the configuration manager's list of reference profiles.

Accordingly, one embodiment of the invention concerns a method for comparatively tracking updates to reference parameters, and synchronizing each local operating parameter counterpart accordingly. In another embodiment, the invention may be implemented to provide an apparatus such as a multiprocessing system, configuration manager, and/or managed unit, configured to operate as discussed above. In still another embodiment, the invention may be implemented to provide a signal-bearing medium tangibly embodying a program of machine-readable instructions executable by a digital data processing apparatus to perform a method to operate one or more components of a multiprocessing system, as discussed above.

The invention affords its users with a number of distinct advantages. First, the invention reduces the time needed to configure and reconfigure computers in a multiprocessing system. Instead of manually issuing commands to configure managed units, the managed units subscribe to centrally maintained configuration profiles and reference characteristics, and automatically receive any changes to the subscribed profiles and reference characteristics. Thus, instead of reconfiguring each managed unit, a system administrator enters changes once at the configuration manager; thereafter, these changes are automatically propagated down to all subscribing managed units. In addition to saving time, this reduces the potential for committing errors in the otherwise tedious work of repeatedly issuing the same configuration commands to the different nodes.

Additionally, the invention still maintains the flexibility for managed units to receive and implement local operating characteristics, apart from any subscriptions.

As a further benefit, the invention minimizes network traffic using version codes to identify new and updated reference characteristics, and then exchanging information as needed rather than all reference characteristics in a subscribed-to profile. Network traffic is also reduced by use of the profile master view, which facilitates profile comparison by the managed unit without having to communicate with the configuration manager. In addition, the invention avoids the need for centrally monitoring the application of updates at all affected managed units, and for managing the necessary history log. Instead, detailed comparison of a managed unit's subscribed-to profiles to the counterpart reference profiles quickly shows which changes (if any) the managed unit requires to its operating characteristics and/or profile master view. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings. As mentioned above, the invention concerns a multiprocessing system in which hierarchically superior configuration managers maintain various reference parameters that are selectively copied by subordinate managed units to form local operating parameters that subsequently guide the operation of these managed units. The invention includes a comparative technique for tracking updates to the reference parameters, and synchronizing each total operating parameter counterpart accordingly.

HARDWARE COMPONENTS & INTERCONNECTIONS

System Architecture

One aspect of the invention concerns a multiprocessing system, which may be embodied by various hardware components and interconnections. The system includes multiple nodes, including one or more configuration managers and one or more managed units. Each managed unit is coupled to a hierarchically superior configuration manager. Configuration managers themselves may also act as managed units with respect to other, hierarchically even more superior configuration managers.

Figure 1:
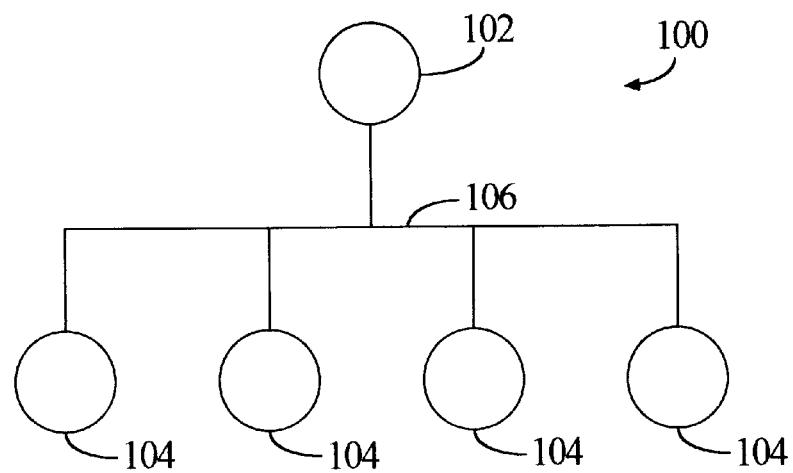
FIG. 1 is a block diagram of one exemplary architecture of multiprocessing system in accordance with the invention.

One example is the system 100 shown in FIG. 1. The system 100 includes multiple nodes, including a configuration manager 102 and multiple managed units 104. The managed units 104 and configuration manager 102 are connected by a communications link 106.

Figure 2:
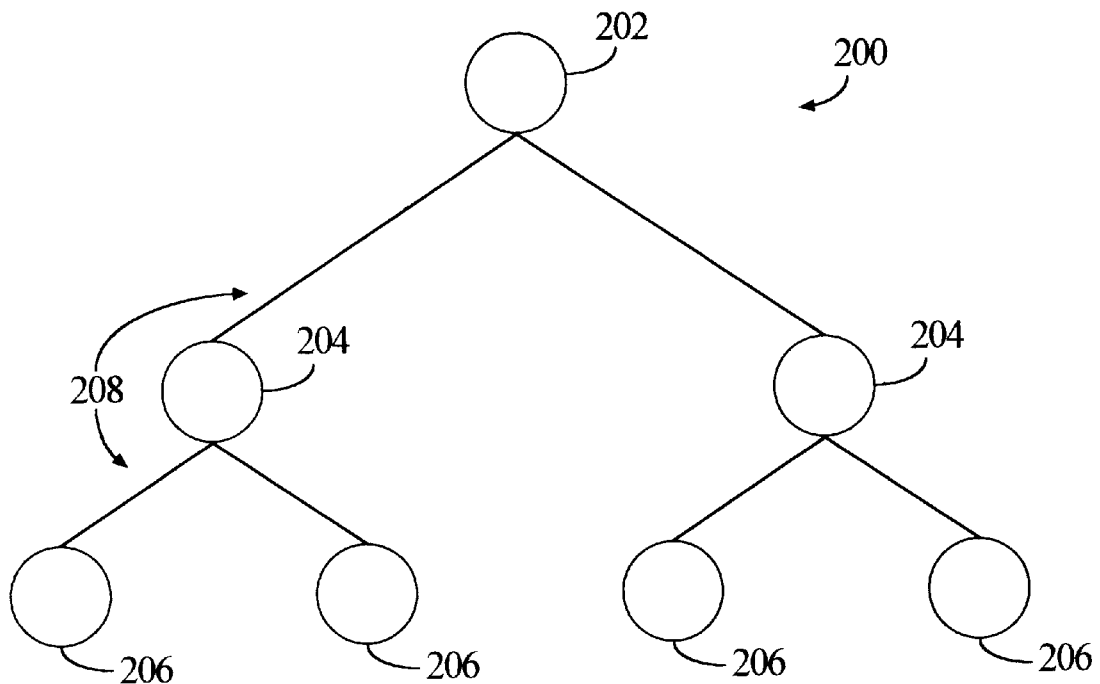
FIG. 2 is a block diagram of a different exemplary architecture of multiprocessing system, configuration managers at multiple levels, in accordance with the invention.

FIG. 2 depicts another example, with multiple managed units 206 that operate under a pair of configuration managers 204. The configuration managers 204, which answer to a higher-level configuration manager 202, may themselves operate as managed units in addition to their roles as configuration managers. The nodes of FIG. 2 are interconnected as shown by the communications link 208.

In addition to the arrangements of FIGS. 1–2, there are many other possible architectures embodying the invention, as will be apparent to those of ordinary skill in the art having the benefit of this disclosure. The multiprocessing system of the invention may be implemented with similar subcomponents, whether embodied by the system 100 (FIG. 1), the system 200 (FIG. 2), or another arrangement. As an example, each node (e.g., configuration manager or managed unit) of the system may comprise a processing element, such as a computing machine, software, or a combination. As examples of computing machines, each node may comprise a personal computer, mainframe computer, workstation, microprocessor, or another digital data processing machine. In contrast, a node may instead comprise an instance of an application program, a software thread, subroutine, or another software construct. Nodes may also be provided by combinations of hardware, software, firmware, and the like.

Each node, whether configuration manager or managed unit, may be implemented by similar or even identical hardware. Accordingly, the configuration managers and managed units may operate together on a "peer-to-peer" basis. As an example, all nodes may comprise digital data storage servers, such as IBM brand RS/6000 machines, running the ADSTAR Distributed Storage Manager (ADSM) storage management software.

The node-interconnecting communications link, such as the links 106 or 208, comprises a suitable hardware and/or software mechanism to relay messages between the nodes. For example, the links 106, 208 may comprise telephone lines, cable television lines, an Ethernet, token ring, ATM network, local area network, wide area network, Internet, Intranet, etc. In implementations where two or more nodes comprise separate application program instances on the same machine, the communications link also includes a motherboard, backplane, LAN card, bus, or other necessary hardware and/or software interconnecting these nodes. Communications over these links may employ any suitable protocol, such as TCP/IP, APPC, etc.

Configuration Manager

Figure 3:
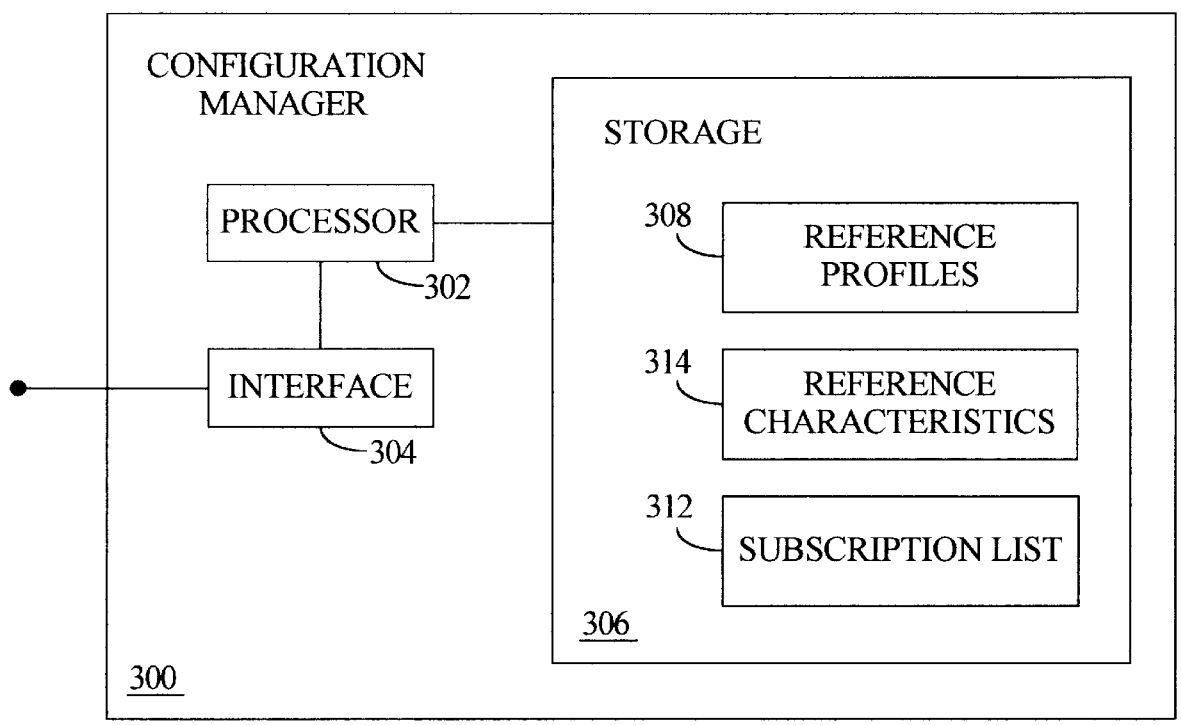
FIG. 3 is a block diagram of an exemplary configuration manager in accordance with the invention.

FIG. 3 shows the subcomponents of an exemplary configuration manager 300 in more detail. The configuration manager 300 includes a processor 302, an interface 304, and a storage 306. The processor 302 may comprise one or more microprocessors, an application-specific integrated circuit, or any other suitable digital data processing element. The interface 304 facilitates communications between the processor 302 and an attached communications link (not shown). The interface 304 may comprise a modem, intelligent input/output channel, bus, or any other suitable structure.

The storage 306 comprises writable non-volatile storage such as magnetic disk storage media, magnetic tape, optical media, battery-supported random access memory (RAM), and the like. The storage 306 includes reference profiles 308, reference characteristics 314, and a subscription list 312. The reference profiles 308 and reference characteristics 314 may be collectively called "reference parameters."

Generally, the reference characteristics 314 comprises a centralized storage of various machine-readable configuration settings. To all managed units of the configuration manager 300 ("subordinate" managed units), the reference characteristics 314 are read-only. As explained below, the subordinate managed units copy selected reference characteristics to local storage, and then use the copied characteristics as locally stored "operating characteristics." Each managed units uses its locally stored operating characteristics to guide its operation.

The list of reference profiles 308 includes a number of individual reference profiles, where each profile is a group of one or more reference characteristics. To the subordinate managed units, the reference profiles 308 are read-only. As discussed below, the managed units "subscribe" to selected reference profiles, thereby indicating a desire to keep locally stored operating characteristics up-to-date with the state of the selected reference profiles. The configuration manager 300 uses the subscription list 312 to track which subordinate managed units have subscribed to which reference profiles. The configuration manager 300 also uses the subscription list 312 to track whether the subscribing managed units have received up-to-date reference characteristics. This is facilitated by using version codes to distinguish updated profiles from earlier versions, as discussed in greater detail below.

To provide a more concrete example, Tables 1–3 (below) depict an exemplary set of reference profiles 308, reference characteristics 314, and subscription list 312 in a data storage system where each node is a data storage server.

TABLE 1

Reference Profiles

| PROFILE NAME | ASSOCIATED REFERENCE CHARACTERISTICS |
|---|---|
| Profile A | 1, 3, 4, 8 |
| Profile B | 1, 2 |
| Profile C | 1 |
| Profile D | 5 |

TABLE 2

Reference Characteristics

| REFERENCE CHARACTERISTIC NUMBER | DETAILS |
| --- | --- |
| 1 | ADMINISTRATOR=MIKE (Password=Wildcat, Authority=System) |
| 2 | ADMINISTRATOR=DAVE (Password=Cougar, Authority=System) |
| 3 | ADMINISTRATOR=CAROLYN (Password=Penguin, Authority=Policy) |
| 4 | SCHEDULE=INCR_BACKUP (Frequency=Daily, Begintime=02:00 DayOfWeek=Any, Action=Incremental) |
| 5 | SCHEDULE=WEEKLY_ARCHIVE (Frequency=Weekly, Begintime=18:30, DayOfWeek=Saturday, Action=Archive) |
| 6 | SCHEDULE=DB_BACKUP (Frequency=Daily, Begintime=05:00, DayOfWeek=Any, Action=DbBackup) |
| 7 | SERVER=CONFIG_MGR (Address=9.115.12.92 Port=1500, Password=batman) |
| 8 | SERVER=TUCSON_BRANCH (Address=9.115.39.123, Port=1500, Password=robin) |

TABLE 3

Subscription List

| MANAGED UNIT | SUBSCRIBED-TO PROFILES |
| --- | --- |
| DEVICE NUMBER 0001 | Profile A (version code 1) |
| DEVICE NUMBER 0002 | Profile A (version code 1) |
| DEVICE NUMBER 0003 | Profile A (version code 1), Profile D (version code 6) |
| DEVICE NUMBER 0004 | Profile B (version code 9), Profile C (version code 3) |
| DEVICE NUMBER 0005 | Profile D (version code 6) |

Managed Unit

Figure 4:
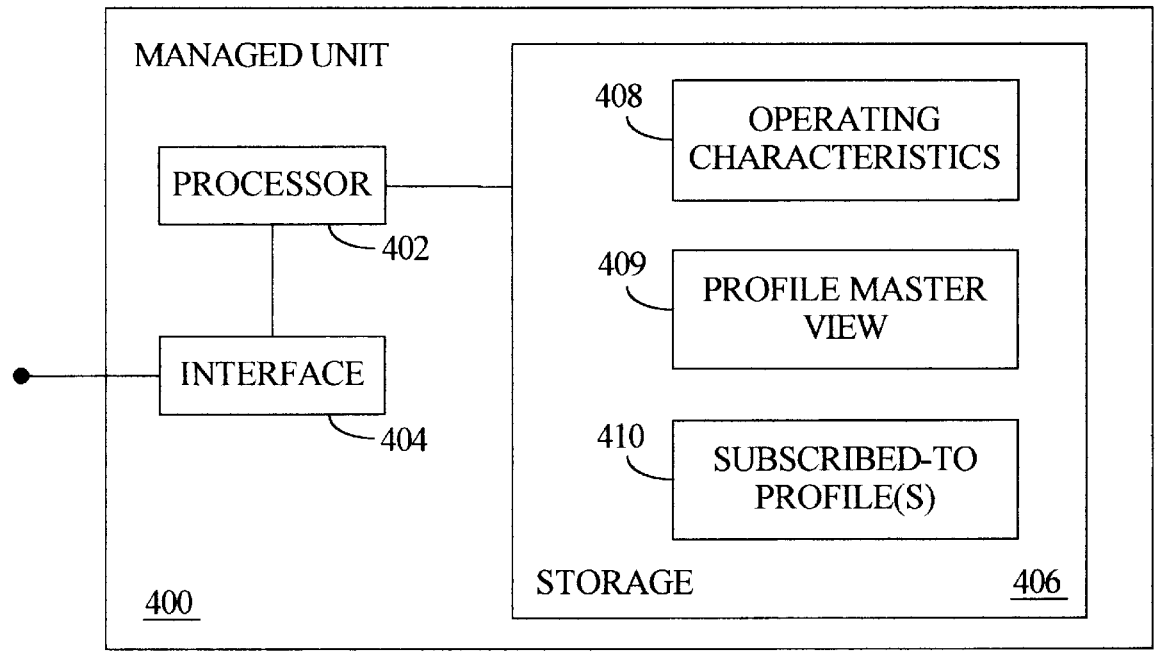
FIG. 4 is a block diagram of an exemplary managed unit in accordance with the invention.

FIG. 4 shows the subcomponents of an exemplary managed unit 400 in more detail. The managed unit 400 includes a processor 402, an interface 404, and a storage 406. The processor 402 may include one or more microprocessors, an application-specific integrated circuit, or any other suitable digital data processing element. The interface 404 facilitates communications between the processor 402 and an attached communications link (not shown). The interface 404 may comprise a modem, intelligent input/output channel, bus, or any other suitable structure.

The storage 406 comprises writable non-volatile storage such as magnetic disk storage media, magnetic tape, optical media, battery-supported random access memory (RAM), and the like. The storage 406 includes operating characteristics 408, subscribed-to profiles 410, and a profile master view 409.

Generally, the subscribed-to profiles 410 contain the names of zero, one, or more reference profiles 308 (FIG. 3), to which the managed unit 400 subscribes. Each subscribed-to profile also includes a version code, as explained below. The content of the reference profiles to which the managed unit 400 subscribes are contained in the profile master view 409, along with the content of all reference profiles 308, as discussed below. The significance of subscription for the managed unit 400 is that the managed unit 400 maintains its own copy of all reference characteristics 314 specified by its subscribed-to profiles 410. This local copy of the reference characteristics 314 is embodied by the operating characteristics 408. The managed unit 400 operates in compliance with the locally stored operating characteristics 408. The operating characteristics 408 may also include other operational characteristics unrelated to the subscribed-to profiles. These additional characteristics, called "local" operating characteristics, may originate from a system administrator, local application program, or another source.

Since a configuration manager's centrally stored reference characteristics 314 and reference profiles 308 may be changed from time to time, the invention provides means to distribute the changes among all affected subordinate managed units. This technique is discussed in greater detail below.

The profile master view 409 is a copy of the configuration manager's reference profiles 308, which the managed unit employs in various ways as discussed below. As explained below, the profile master view may be used to query profile information without any network overhead, i.e., communication with the configuration manager. Another benefit of locally storing the profile master view is that managed units can identify which profiles or associated characteristics have been deleted since the last refresh by comparing profile contents. The configuration manager does not need to maintain historical information such as lists of deleted operational characteristics.

Exemplary Digital Data Processing Apparatus

Another aspect of the invention concerns a digital data processing apparatus, provided to implement one or more managed units or configuration manager. This apparatus may be embodied by various hardware components and interconnections, as discussed below.

Figure 5:
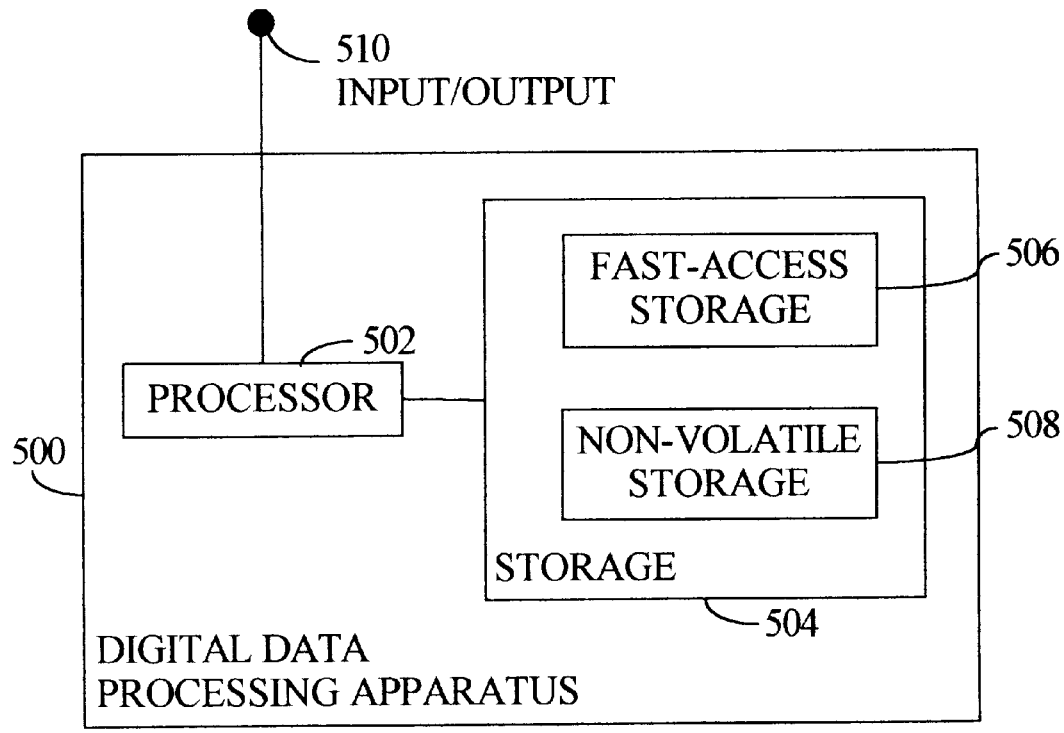
FIG. 5 is a block diagram of a digital data processing machine in accordance with the invention.

FIG. 5 shows an example of one digital data processing apparatus 500. The apparatus 500 includes a processor 502, such as a microprocessor or other processing machine, coupled to a storage 504. In the present example, the storage 504 includes a fast-access storage 506, as well as nonvolatile storage 508. The fast-access storage 506 may comprise RAM, and may be used to store the programming instructions executed by the processor 502. The nonvolatile storage 508 may comprise, for example, one or more magnetic data storage disks such as a "hard drive," a tape drive, or any other suitable storage device. The apparatus 500 also includes an input/output 510, such as a line, bus, cable, electromagnetic link, or other means for the processor 502 to exchange data with other hardware external to the apparatus.

Despite the specific foregoing description, ordinarily skilled artisans (having the benefit of this disclosure) will recognize that the apparatus discussed above may be implemented in a machine of different construction, without departing from the scope of the invention. As a specific example, one of the components 506, 508 may be eliminated; furthermore, the storage 504 may be provided on-board the processor 502, or even provided externally to the apparatus 500.

OPERATION

In addition to the various hardware embodiments described above, a different aspect of the invention concerns a method for operating a multiprocessing system in which hierarchically superior configuration managers maintain various reference parameters that are selectively copied by subordinate managed units to form local operating parameters that subsequently guide the operation of these managed units. The invention includes a comparative technique for tracking updates to the reference parameters, and synchronizing each local operating parameter counterpart accordingly.

Signal-Bearing Media

In the context of FIGS. 1–5, such a method may be implemented, for example, by operating the configuration managers and managed units, as embodied by digital data processing apparatuses 500, to execute respective sequences of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform the functions of configuration manager or managed unit as explained herein.

Figure 6:
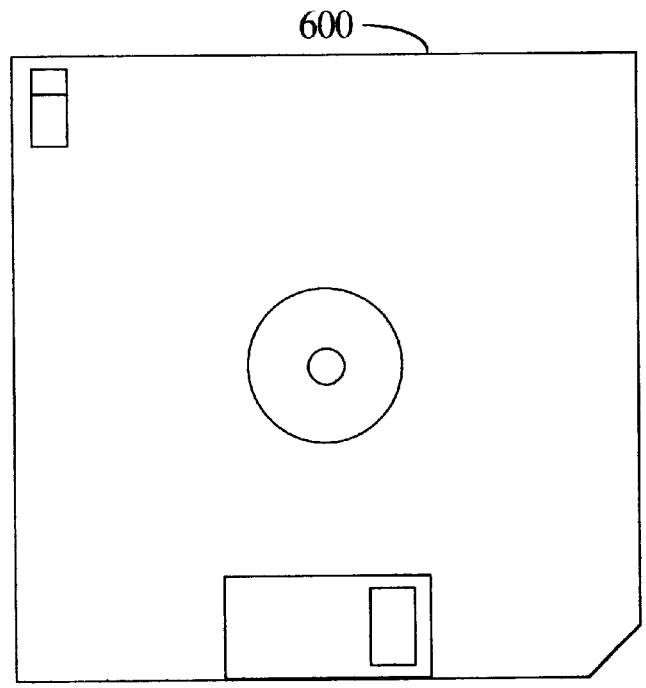
FIG. 6 shows an exemplary signal-bearing medium in accordance with the invention.

This signal-bearing media may comprise, for example, RAM (not shown) contained within storage of the configuration manager or managed unit, as represented by the fast-access storage 506 for example. Alternatively, the instructions may be contained in another signal-bearing media, such as a magnetic data storage diskette 600 (FIG. 6), directly or indirectly accessible by the processor 502. Whether contained in the storage 506, diskette 600, or elsewhere, the instructions may be stored on a variety of machine-readable data storage media, such as direct access storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Configuration Manager: Operation

Figure 7:
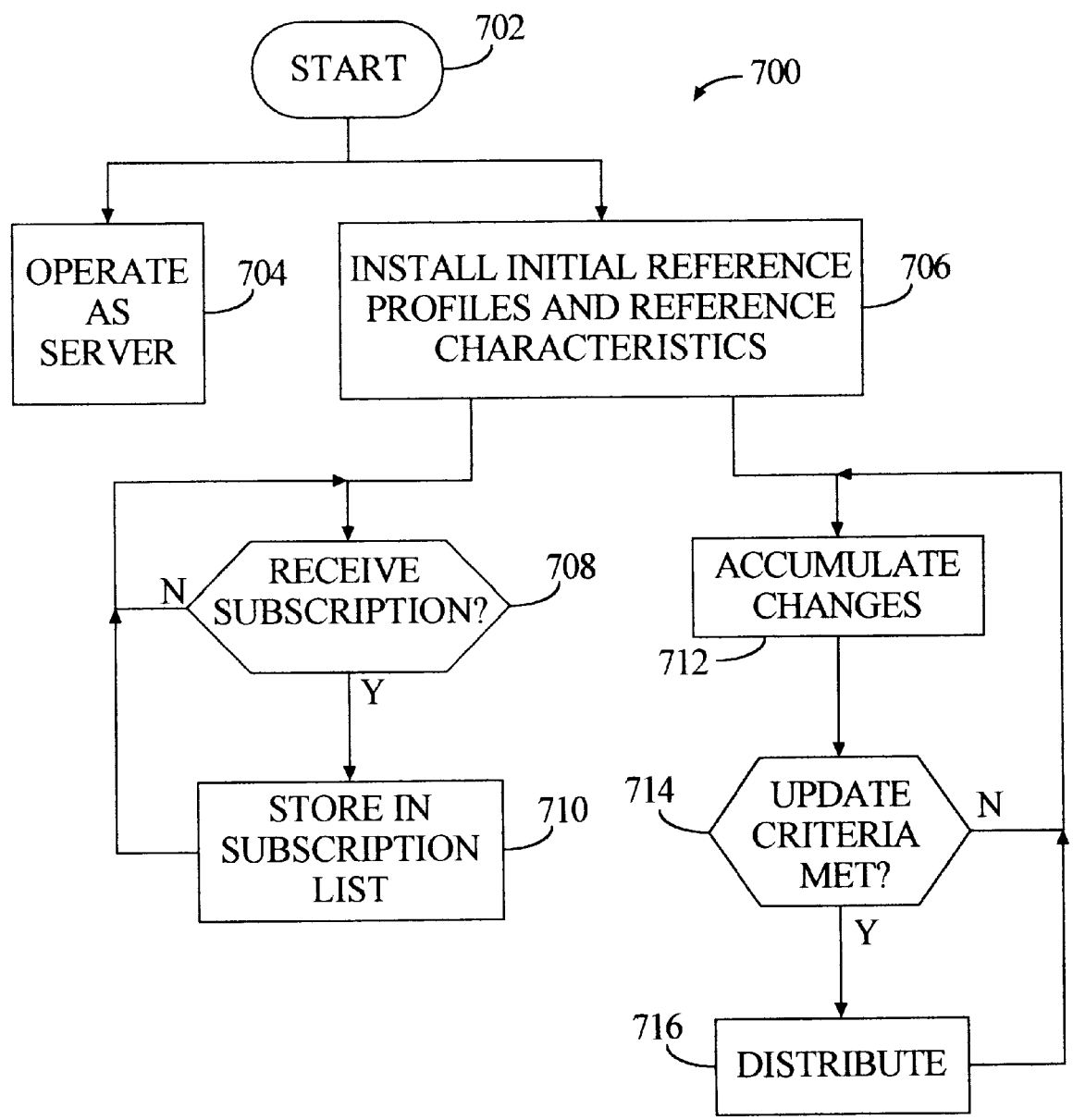
FIG. 7 is a flowchart of an exemplary operating sequence for a configuration manager in accordance with the invention.

As mentioned above, configuration managers maintain various reference profiles to which subordinate managed units selectively subscribe. Whenever the profiles or their reference characteristics change, the configuration managers propagate the changes down to all affected managed units. FIG. 7 shows an exemplary process sequence 700 to describe the operation of an exemplary configuration manager in a multiprocessing system according to the invention. For ease of explanation, but without any intended limitation, the example of FIG. 7 is described in the context of the hardware environment described above in FIGS. 1–4.

The operations 700 are initiated in step 702, which may be performed when the configuration manager 300 is powered-up, re-started, or otherwise begins operation. Following step 702, the configuration manager 300 may (optionally) conduct other operations 704, aside from its role as a configuration manager. For instance, in the data storage system embodiment used presently, the configuration manager 300 may operate as a data server, as shown by step 704.

Concurrently with these non-manager operations (step 704), the configuration manager 300 performs tasks involved in overseeing the managed units (steps 706–716). Specifically, in step 706 the configuration manager installs an initial set of reference profiles 308 and reference characteristics 314. As an example, these initial settings may be manually set by a system administrator.

After step 706, the configuration manager 300 begins the concurrent processes of (1) receiving and processing managed units' subscriptions, and (2) accumulating and propagating changes to reference profiles and/or reference characteristics that affect subscribing managed units. Step 708 starts the subscription process. Namely, in step 708 the configuration manager 300 waits until it receives a subscription message from a managed unit. Subscription messages comprise requests from managed units to subscribe to one of the pre-defined reference profiles 308. As such, a subscription includes the name of the desired reference profile, and the identity of the managed unit requesting subscription. When the configuration manager 300 receives a subscription message in step 708, the configuration manager 300 updates the subscription list 312 to show the subscribed-to profile in association with the subscribing managed unit (step 710). Following step 710, step 708 waits for another subscription.

In parallel with steps 708–710, the configuration manager 300 collects and distributes changes to the reference parameters. As an example, these changes may originate from a system administrator (not shown) accessing the configuration manager. To provide another example, these changes may originate from another configuration manager that is hierarchically superior to the present configuration manager 300, where this superior configuration manager propagates the changes downward to the present configuration manager 300.

The configuration manager 300 receives and accumulates the changes in step 712. These changes may include changes to the reference characteristics 314 and/or the reference profiles 308. The accumulation of the changes in step 712 may involve (1) buffering changes and then implementing them in storage 306, (2) not buffering any changes but marking the changed profiles and/or characteristics in a directory such as a table, list, bitmap, etc., or (3) another approach.

In step 714, the configuration manager 300 determines whether certain prescribed update criteria have been met to start distributing the accumulated changes. The update criteria may be set by a system administrator or other user, permanently incorporated into the firmware or other programming of the processor 302 upon manufacture of the configuration manager 300, or established in another way. As mentioned above, the update criteria determine when the configuration manager 300 propagates changes in the reference parameters down to the subordinate managed servers. The criteria may take various embodiments in accordance with this invention, such as:

Threshold Number of Changes: As one example, the configuration manager 300 may deem the criteria met whenever it receives a threshold number of changes, such as five changes.

Fixed Time Period: As another example, the configuration manager 300 may deem the criteria met on a periodic basis, such as one hour. In this embodiment, the criteria may be met, for example, each time a repeating timer expires.

Request by Subordinate Managed Units: As still another example, the configuration manager 300 may deem the criteria met whenever one or more subordinate managed units submit requests to download accumulated changes. The managed units may submit such requests on any appropriate basis, such as periodically.

If step 714 finds that the update criteria are not met, step 712 continues to accumulate incoming changes. When the update criteria of step 714 are finally met, the configuration manager 300 in step 716 distributes or "propagates" the accumulated changes. To distribute the changes, the configuration manager 300 cross-references the accumulated changes with the subscription list 312 to identify all managed units requiring update propagation. If an accumulated change concerns a change to a reference profile, the configuration manager transmits the changed profile to all managed units, as discussed in greater detail below.

According to one embodiment of the invention, update criteria may be chosen so that they are met individually on a managed-unit-by-managed-unit basis, or more universally for all managed units together. Therefore, in step 716 the configuration manager 300 may propagate updates to all subscribing managed units, or to certain individual managed units requiring updates, depending on which update criteria are used.

If a reference profile has changed the configuration manager 300 also examines the changed profile to determine whether the profile includes any reference characteristics that were not previously in that profile. If there have been any added reference characteristics the configuration manager 300 also transmits these new reference characteristics to the subscribing managed units. As an additional feature, the configuration manager 300 may determine whether subscribing managed units already have such reference characteristics due to a subscription to a different profile; in this event, the configuration manager 300 may skip sending the duplicate reference characteristics. When the accumulated changes have been distributed, completing step 716, the routine 700 returns to step 712 to accumulate more changes.

Managed Unit: Operation

Figure 8:
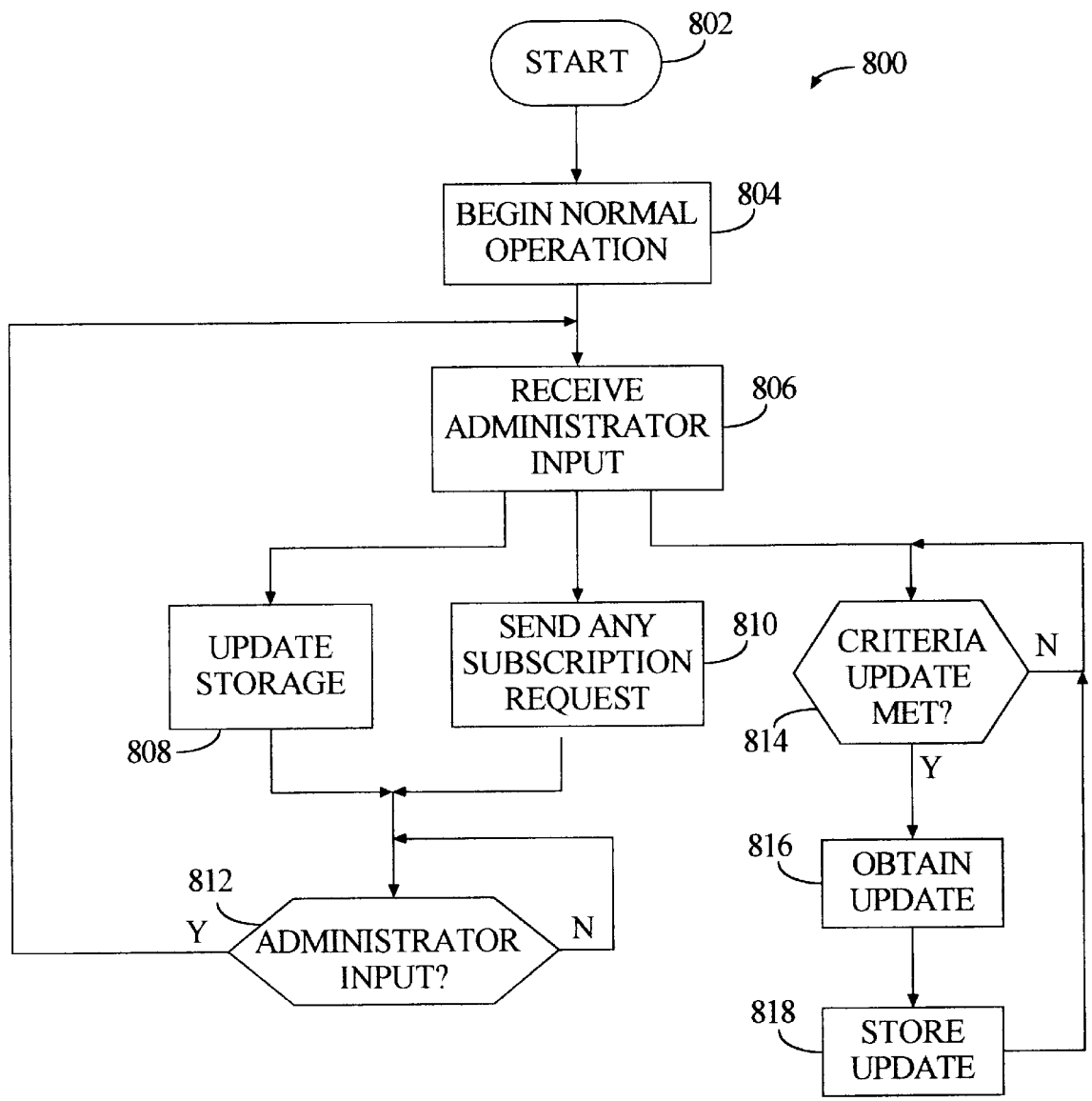
FIG. 8 is a flowchart of an exemplary operating sequence for a managed unit in accordance with the invention.

As mentioned above, managed units selectively subscribe to various reference profiles of constituent reference characteristics maintained by hierarchically superior configuration managers. Whenever the reference profiles or their reference characteristics change, the configuration managers automatically propagate the changes down to all managed units, which store and implement and then operate pursuant to the changes. FIG. 8 shows an exemplary process sequence 800 to describe the operation of an exemplary managed unit in a multiprocessing system according to the invention. For ease of explanation, but without any intended limitation, the example of FIG. 8 is described in the context of the hardware environment described above in FIGS. 1–4.

The operations are initiated in step 802, which may be performed when the managed unit 400 is powered-up, re-started, or otherwise begins operation. Following step 802, the managed unit 400 starts normal operations (step 804). In the illustrated example, where the managed unit is a storage server, these operations may involve satisfying storage access requests of one or more hosts, clients, or other machines (not shown) coupled to the managed unit 400. While these operations continue, the managed unit 400 receives certain input in step 806, for the purpose of initially configuring the managed unit 400. In the illustrated example, this input is received from a system administrator (not shown), who accesses the configuration manager 400 via an attached console, remote terminal, another computer, or another suitable mechanism (not shown).

This initial administrator input may include manual entry of one or more locally-set operating characteristics, such as those configuration settings needed to enable communication with the configuration manager, perform basic local operations, etc. During subsequent post-initial performance of step 806, the administrator input may include items such as the following:

New Subscription: The input may include a request to subscribe to a profile, to which the managed unit 400 does not already subscribe.

Deleted Subscription: The input may specify deletion of a subscription to a profile that the managed unit subscribes to.

Local Operating Characteristics: The input may also include addition or deletion of one or more "locally-set" operating characteristics, added by manual input, 5 rather than the managed unit receiving them via subscription. As a result, these operating characteristics are not updated by subscription. As on optional embodiment, the settings of local operating characteristics may automatically yield to any conflicting operating characteristics arising from subscribed-to profiles. This conflict resolution may be set by default, by administration election, or another appropriate means.

After the initial input is received in step 806, several things occur concurrently. Namely, the managed unit 400 updates the storage 406 according to the new input (step 808). In the case of request to add or delete subscribed-to profiles, the managed unit 400 adds (or deletes) the profiles to (or from) the list of subscribed-to profiles 410. In the case of a locally-set operating characteristics, the managed unit 400 adds (or deletes) the operating characteristics from the list 408. After step 808, the configuration manager 400 determines whether it has received any more input (step 812), such as administrator input in the present example. When the managed unit 400 receives further input, step 812 returns to step 806 to receive this input, as discussed above.

Concurrently with step 808, the managed unit 400 sends any necessary subscription requests (step 810), in order to implement the input of step 806. For instance, if the step 806 input requested subscription to a new profile, the managed unit 400 in step 810 sends a subscription message to the configuration manager 300 to subscribe to that profile. The subscription message includes an identification of the profile and the managed unit 400 requesting subscription. If the input of step 806 requested removal of a subscribed-to profile, the managed unit 400 may send an appropriate message to the configuration manager 300 requesting withdrawal from subscription to that profile. Alternatively, the managed unit 400 may add or delete profiles to/from the list of subscribed-to profiles 410, and wait for the configuration manager 300 to initiate updating of its subscription list 312 to match the managed units' lists of subscribed-to profiles 410. In either case, processing of subscriptions by the configuration manager 400 is discussed above in step 708, FIG. 7.

Concurrently with steps 808, 810, and 812, the managed unit 400 determines whether the prescribed criteria have been met (step 814) to obtain reference parameter updates accumulated by the configuration manager 300. The update criteria may be set by a system administrator or other user, permanently incorporated into the firmware or other programming of the processor 402 upon manufacture of the managed unit 400, or established in another way. As mentioned above, these criteria determine when the managed unit 400 obtains changes in the reference parameters from the configuration manager 300. The criteria may take various embodiments in accordance with this invention, such as:

- Locally-Determined Criteria: In one example, the managed unit may deem the criteria met upon any appropriate local condition, such as (1) expiration of a periodic local timer, (2) according to a non-periodic local schedule, or (3) another basis.
- Propagation By Configuration Manager: In another example, the configuration manager alone may determine when to propagate changes to subordinate managed units. As mentioned above, this decision may be made on the basis of receiving a threshold number of changes, expiration of a fixed time period, etc. In this embodiment, the managed unit 400 deems the update criteria to be met (step 814) when changes are propagated from the configuration manager.

Step 814 repeats until the update criteria are met, and then progresses to step 816. In step 816, the managed unit obtains the updated reference parameters. If the update criteria were met by local criteria (e.g., local timer expiration, prescribed local schedule, etc.), then step 816 involves the managed unit 400 requesting and receiving updated reference parameters (if any) from the configuration manager 300. In contrast, if the update criteria were met by the configuration manager propagating changes according to its own schedule, then step 816 involves the managed unit 400 receiving the propagated changes sent by the configuration manager 300. In either case, each update of steps 816–818 always includes a change to a master profile, and may also include changes to the operating characteristics 408.

In either of the foregoing embodiments, step 816 is followed by step 818, where the managed unit 400 stores the received updates in the storage 406. Following step 818, the routine 800 returns to step 814, awaiting satisfaction of the update criteria again.

Partial Reference Characteristic Propagation

As illustrated, when changes to a reference characteristic are propagated (step 716, FIG. 7), the entire content of that reference characteristic is transmitted. Alternatively, the configuration manager 300 may limit propagation to the changed parts of the reference characteristic. This saves transmission time, and expedites the update process. To support partial reference characteristic propagation, the configuration manager 300 is programmed to track the contents of the reference characteristics involved in each managed unit's subscriptions. Then, before distributing updates (step 716, FIG. 7), the configuration manager 300 compares the tracked contents to the current contents to specifically identify the changes. As one example, this process may be achieved by the configuration manager 300 logging changes to reference characteristics in a change log.

As a further expansion to reference characteristic propagation, it may be useful to permit hierarchically arranged reference characteristics. In this embodiment, a "parent" reference characteristic may include, among other things, one or more lower-level reference characteristics. When any lower-level reference characteristic is changed, the "parent" reference characteristic is also considered to be changed. Changes to lower-level reference characteristics are accumulated in step 712, resulting in the subsequent distribution of the entire parent reference characteristic, in the manner discussed above. As an alternative, the propagation of changes to lower-level reference characteristics of a parent reference characteristic may be limited to the changed lower characteristics only, rather than the entire parent.

COMPARATIVE UPDATE TRACKING

Characteristic & Profile Versions

Introduction

Figure 9:
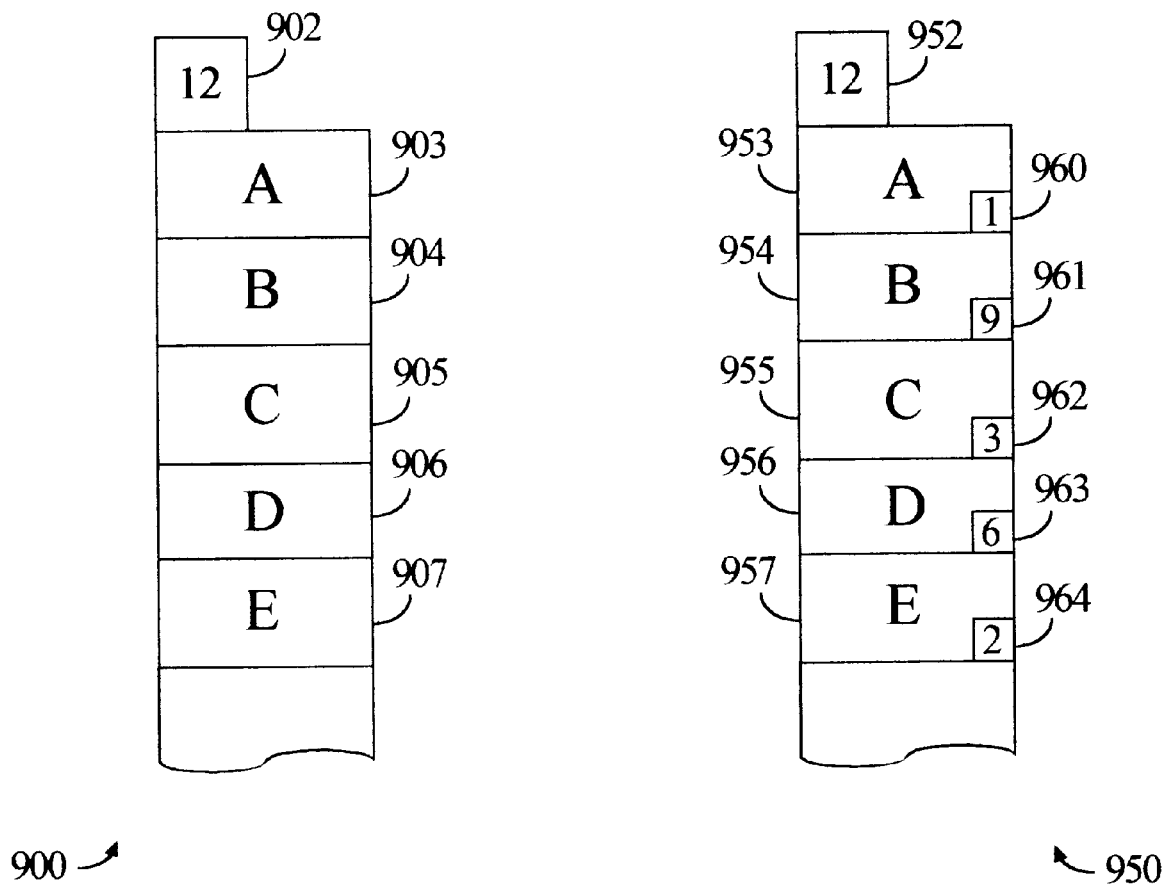
FIG. 9 is a block diagram illustrating the components of an exemplary master profile and an exemplary reference profile, in accordance with the invention.

FIG. 9 shows the components of an exemplary master profile 900 maintained by a managed unit (in the profile master view 409), and an exemplary reference profile 950 maintained by the configuration manager (in the reference profiles 308). Although other arrangements may be used without departing from the invention, the present example helps to illustrate one embodiment of the invention, and also provides a useful foundation for the comparative update tracking process, which is described below.

The reference profile 950 includes multiple reference characteristics (953–957) and a profile version code (952). The profile version code 952 is incremented once whenever the profile 950 is manually changed. Such manual changes may occur, for example, when the profile 950 is changed by a system administrator The profile version code 952 is also incremented by one wherever any of the profile's constituent reference characteristics 953–957 experience an update.

The characteristic version codes 960–964 of the individual reference characteristics 953–957 represent the reference profile's version code at the respective times when the individual reference characteristics 953–957 were last added or updated. For example, the reference characteristic 953 was added upon the adoption of version number one of the profile 950, as shown by the characteristic version code 960. Similarly, the reference characteristic 956 was added upon the adoption of version number six of the profile 950, as shown by the characteristic version code 963.

Versions—Master Profile

Similar to the reference profile 950, each profile in the profile master view 409 includes multiple operating characteristics and a profile version code. An example is shown by the master profile 900, which includes multiple operating characteristics 903–907 and a profile version code 902. As explained below (step 1116, FIG. 11), each master profile is updated to match its counterpart reference profile, which serves as the source for that master profile. Specifically, the version code of a master profile is copied exactly from the version code of its reference profile counterpart. For example, if a master profile is updated according to reference profile version twelve, that master profile will assume version twelve itself.

Versions—Subscribed-to Profile

Although not shown in FIG. 9, each profile in the list of subscribed-to profiles 410 contains the name and version code of a reference profile that the managed unit 400 subscribes to. In the illustrated embodiment, subscribed-to profiles do not list their constituent operating characteristics. These are shown by the expanded profile contained in the profile master view 409, as shown above.

Identifiers

Rather than the actual content of the constituent operating characteristics themselves, the master profile 900 may list suitable identifiers 903–907 of the constituent reference characteristics. Similarly, rather than the content of the constituent reference characteristics themselves, the reference profile 950 may list suitable identifiers 953–957 of the corresponding reference characteristics. In one embodiment, These identifiers comprise reference characteristic names; however, the identifiers may comprise table or other indices, address pointers, or other suitable identifiers instead The reference profiles 308 identify (e.g., by name) corresponding reference characteristics 314, all of which are stored together in the configuration manager's storage 306. In contrast, the constituent reference characteristics of the master profiles 409 may not all reside in the managed units storage 406; those reference characteristics named by subscribed-to profiles are stored in the list of operating characteristics 408, but the remaining referenced characteristics named by the master profiles 409 are stored only back at the configuration manager's list 314.

Changing a Reference Profile

Figure 10:
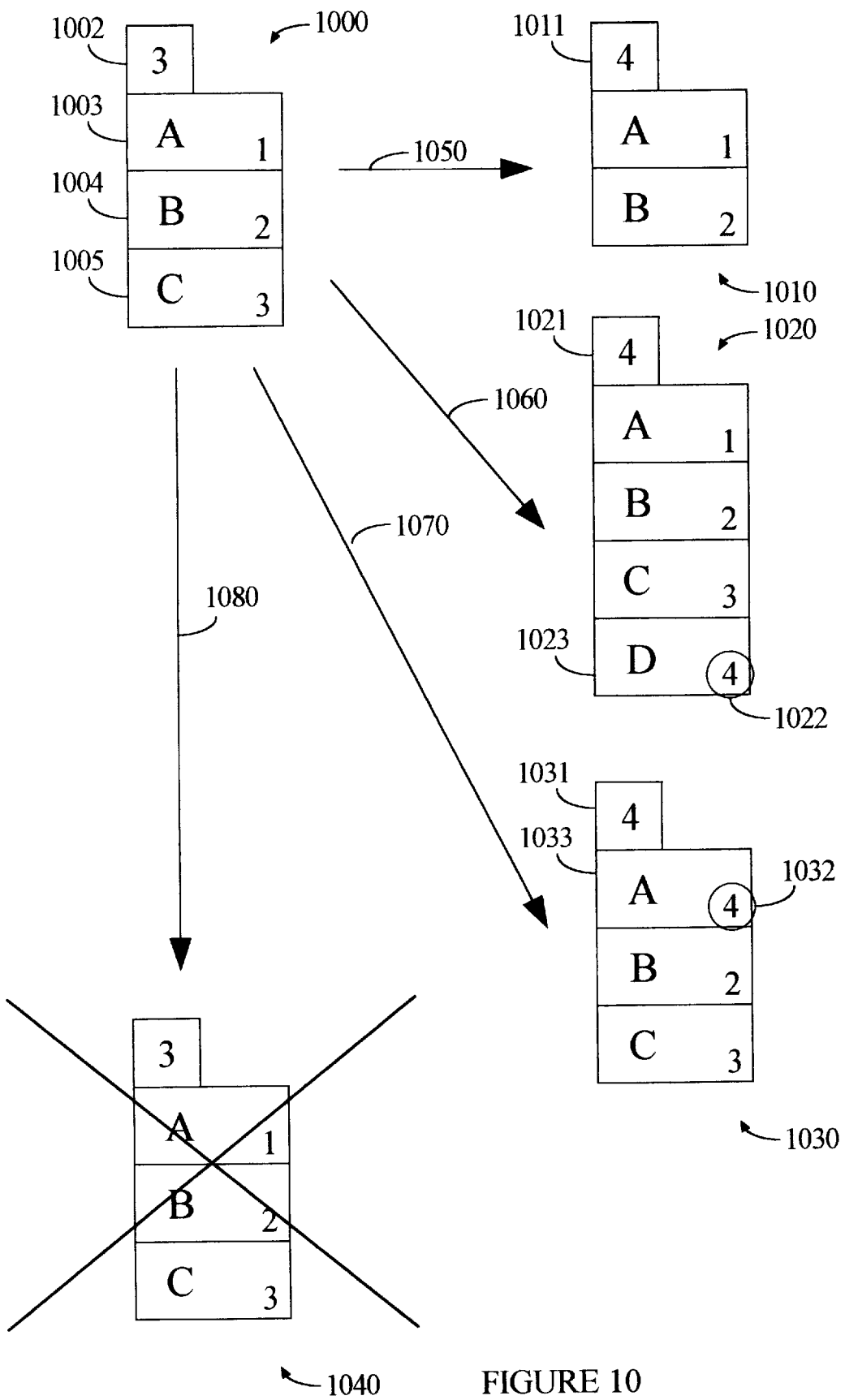
FIG. 10 is a block diagram showing how the components of a reference profile change with deletion, addition, and updating of a reference characteristic, as well as deletion of the reference profile entirely, in accordance with the invention.

FIG. 10 shows several illustrative update operations occurring to an exemplary reference profile 1000 stored in the list 308 at the configuration manager 300. Reference profiles may be changed under various circumstances, such as (1) a system administrator accessing the configuration manager, (2) downloading of changes from another, hierarchically superior, configuration manager, or (3) other situations.

In this example, the profile 1000 has a profile version code 1002 of three, and includes constituent reference characteristics 1003–1005. The transition 1050 shows how the reference profile 1000 in the list 308 is updated by deleting a constituent reference characteristic. Namely, the reference characteristic 1005 is deleted, yielding an updated reference profile 1011. Since the original reference profile 1000 had a profile version code 1002 of three, the new reference profile 1010 has a profile version code 1011 of four.

As an alternative to the transition 1050, the reference profile 1000 may instead be modified by adding another constituent reference characteristic as shown by the transition 1060. Namely, the reference characteristic 1023 is added, yielding an updated profile 1020. Since the original profile 1000 had a profile version code 1002 of three, the new reference profile 1020 has a profile version code 1021 of four. Moreover, the added reference characteristic 1023 shows a characteristics version code 1022 of four, since it was added upon adoption of the reference profile having a profile version code of four.

As an alternative to the transitions 1050, 1060, the reference profile 1000 may instead be modified by updating one of its constituent reference characteristics, as shown by the transition 1070. Namely, the reference characteristic 1003 is updated by introduction of a newer version of the same reference characteristic. In this example, the reference characteristic 1003 is replaced by the newer reference characteristic 1033. This yields an updated reference profile 1030. Since the original reference profile 1000 had a profile version code 1002 of three, the new reference profile 1030 has a profile version code 1031 of four. Moreover, the updated reference characteristic 1033 shows a characteristic version code 1032 of four, since it was added at the adoption of the reference profile having a profile version code of four.

As an alternative to the transitions 1050, 1060, 1070, the reference profile 11300 may instead be entirely deleted. In this case, the reference profile 1000 is removed from the list 308 by deleting its profile version number 1002, the constituent reference characteristic identifiers 1003–1005, and the characteristic version codes. As explained below, deletion of the profile 1000 does not delete the constituent reference characteristics themselves, only the identifiers (e.g., pointers) present in the profile 1000.

Comparative Update Tracking: Operating Sequence
Introduction

Figure 11:
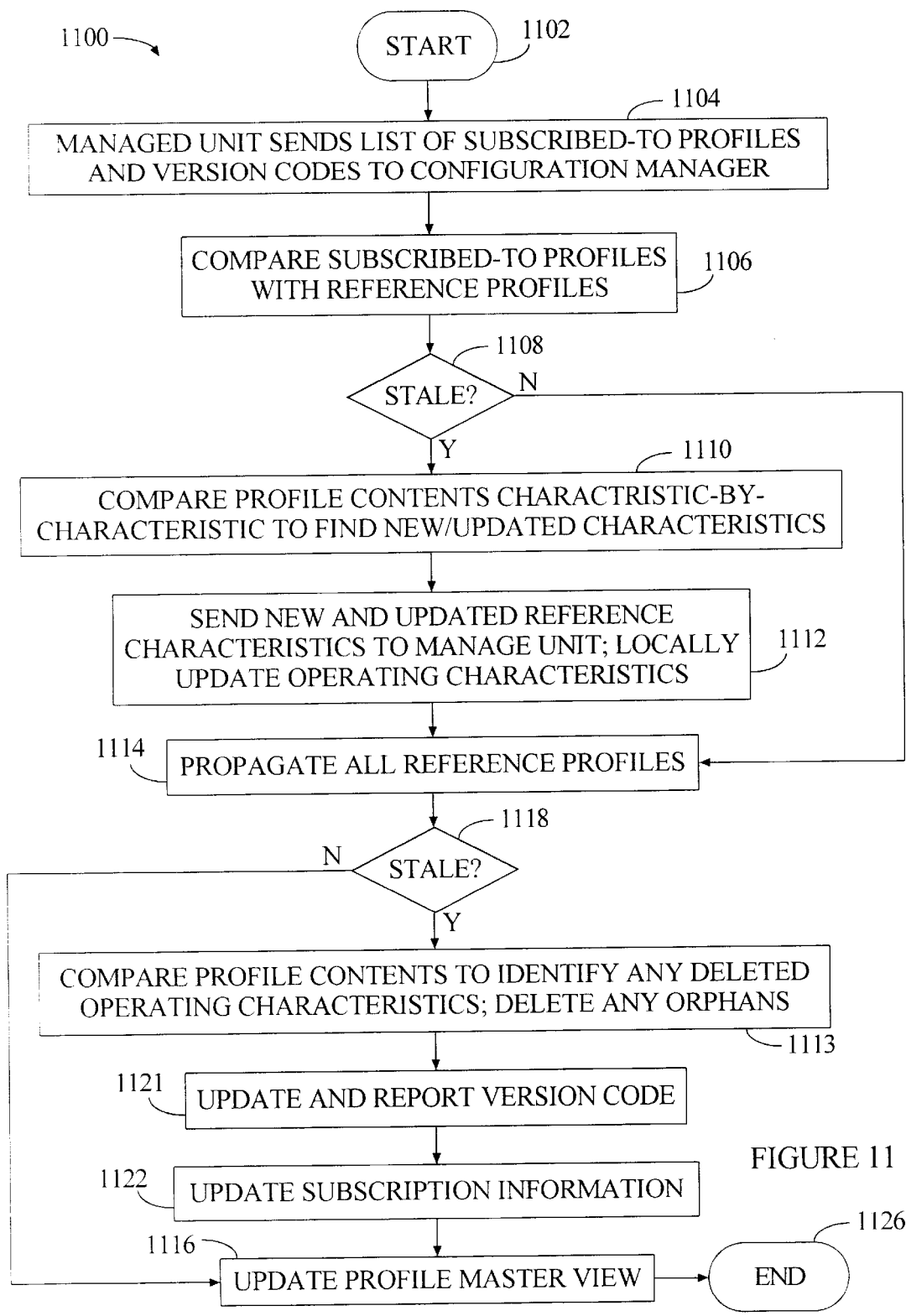
FIG. 11 is a flowchart of an exemplary operating sequence for analyzing locally stored operating parameters against centrally maintained reference parameters, and locally implementing the resultant changes.

The foregoing illustrations show the structure of reference and master profiles and their constituent reference characteristics (FIG. 9), and several illustrative update sequences (FIG. 10). With this foundation, reference is made to FIG. 11 to describe the operations of an exemplary update sequence 1100. For ease of explanation, I but without any intended limitation, the example of FIG. 11 is described in the context of the hardware environment described above in FIGS. 1–4.

The sequence 1100 further embellishes the operations involved in updating a managed unit's operating characteristics, subscribed-to profiles, and master profiles. In one flow diagram, the sequence 1100 explains the duties of both configuration manager and managed unit involved in an update; thus, the routine 1100 expands previously described operations shown in step 716 (performed by the configuration manager) and steps 816–818 (performed by the managed unit). Accordingly, the routine 1100 starts in step 1102, which occurs when the update criteria are satisfied, as illustrated in step 714 (FIG. 7) and step 814 (FIG. 8).

Identifying Stale Subcribed-to Profiles

After step 1102, the managed unit 400 transmits its list of subscribed-to profiles 410 to the configuration manager 300. The reason for sending the subscribed-to profiles 410 is to permit the configuration manager 300 to compare the subscribed-to profiles 410 to the reference profiles 308, and detect any "stale" subscribed-to profiles. "Stale" subscribed-to profiles are defined as any subscribed-to profiles that are older than their counterparts in the list of reference profiles 308. Staleness is detected by comparing version codes of each subscribed-to profile and the reference profile counterpart with the same name. As explained below, the configuration manager detects stale subscribed-to profiles in step 1106, and this fact is used to update the operating characteristics of subscribed-to profiles (step 1108–1112, 1113) and to update the subscribed-to profiles themselves (step 1121).

As an alternative to steps 1104–1106 as illustrated, the configuration manager 300 may send the managed unit 400 its list of reference profiles 308 (step 1104). In this embodiment, the managed unit 400 compares the configuration manager's reference profiles 308 to the locally-stored subscribed-to profiles 410 (step 1106). For explanatory purposes, the current illustration depicts comparison by the configuration manager 300.

Whether performed by the configuration manager or the managed unit, comparison of subscribed-to profiles to reference profiles is performed as follows. Each subscribed-to profile's version code is compared to the version code of its reference profile counterpart to determine whether the subscribed-to profile is current. If the subscribed profile's version code is older than the reference profile's version code, the subscribed-to profile is "stale."

If the comparison of step 1106 shows that a subscribed-to profile's reference profile counterpart no longer exists in the list 308, then the subscribed-to profile is an "orphan" profile. In this event, the managed unit prompts a system administrator for input on how to proceed.

Detecting and Implementing New or Updated Operating Characteristics

Having made the necessary comparison to identify any stale subscribed-to profiles, step 1108 asks whether any stale subscribed-to profiles were found. If so, steps 1110–1112 proceed to analyze the differences in each subscribed-to profile to identify any new or updated operating characteristics that must be downloaded to the managed unit. Steps 1110–1112 are performed for each stale subscribed-to profile. Steps 1110–1112 are performed to ensure that the managed unit 400 contains the latest versions of the operating characteristic versions in its list 408.

The detailed comparison of profile contents is performed by comparing the reference profile against the version code of the subscribed-to profile (which was sent to the configuration manager 300 in step 1104). In step 1110, the configuration manager 300 compares the version code of the stale subscribed-to profile to that of its reference profile counterpart. Particularly, step 1110 examines the characteristic version codes 960–964 (FIG. 9) of each reference characteristic 953–957 to determine whether any version code is more recent than the version code of the stale subscribed-to profile. If so, this means the subcribed-to profile refers to a stale operating characteristic version. For each stale operating characteristic, the configuration manager 400 sends an up-to-date version of the counterpart reference characteristic to the managed unit 400 (step 1112). In response, the managed unit 400 stores the received reference characteristic in its list 408 in replacement of the stale operating characteristic.

Step 1110 also identifies any "new" reference characteristics that have been added to the reference profile without addition to the master profile yet (step 1110). For each added reference characteristic, the configuration manager 400 sends the reference characteristic to the managed unit 400 (step 1112).

Downloading Profile Master View

After step 1112, the configuration manager 300 downloads all reference profiles to the managed unit 400 (step 1114). This is performed so that (1) the managed unit can compare its profile master view to the up-to-date reference profiles to detect any deleted reference characteristics, and also (2) for use in updating the managed unit's profile master view (as discussed below). The downloaded reference profiles are stored without deleting or changing contents of the existing, but possibly out-of-date, profile master view 409.

Detecting and Purging Orphan Operating Characteristics

After step 1114, step 1118 asks whether there are any stale subscribed-to profiles; this was determined in step 1106, discussed above. If not, there is no need to search for deleted reference characteristics, because none of the subscribed-to profiles are stale. In this case, the routine 1100 advances to step 1116, which is discussed below.

If step 1118 finds any stale subscribed-to profiles, then the routine 1100 proceeds to step 1113, which begins the operation of analyzing the master profiles to detect any reference characteristics that have been deleted from the reference profiles 308, but remain in the master profiles 409. The comparison of step 1113 searches for any operating characteristics that are present in the stale master profile but missing from the counterpart reference profile. When the stale master profile is later updated (as described below), this operating characteristic will be deleted from the master profile. Also, if no other reference profiles contain the operating characteristic, it is an "orphan." In this event, the managed unit step 1113 deletes the orphan operating characteristic from the list 408.

Updating Version of Subscribed-to Profile

After step 1113, the managed unit 400 updates the version codes of each stale subscribed-to profile in the list 410 (step 1121). This may be performed, for example, by copying the version code 902 of the corresponding reference profile, which was sent in step 1114. Also in step 1121, the managed unit reports the new version codes to the configuration manager.

Updating the Subscription List

After step 1121, the configuration manager 300 in step 1122 updates its subscription list 312 in accordance with the new version codes of subscribed-to profiles, which were sent in step 1121.

Updating Profile Master View

After step 1122 (or a negative answer to step 1118), step 1116 updates the managed unit's profile master view 409 in accordance with the up-to-date reference profiles that were downloaded in step 1114. As an example, step 1116 may be performed by deleting contents of the storage 409, and storing the downloaded reference profiles 308 there. As discussed below, the local presence of the profile master view helps the managed unit more efficiently analyze and update its subscribed-to profiles 410.

After step 1116, the routine 1100 ends in step 1126. At this point, the managed unit returns to step 814 (FIG. 8) of its operating sequence 800, whereas the configuration manager returns to step 712 (FIG. 7).

Handling New Subscription Requests

With comparative update tracking as described above, the invention may employ an alternative process for subscription by a managed unit. As described above, a managed unit subscribes to a reference profile by submitting a subscription message in step 810 (FIG. 8). As an alternative, the managed unit may store a subscribed-to profile having a version code of zero in the list 410 without sending any subscription to the configuration manager. This subscribed-to profile identifies the name of a reference profile for which subscription is desired, and lists a version code of zero.

In this embodiment, the configuration manager always uses positive integers when adding new reference profiles. Thus, during the routine 1100, any subscribed-to profiles with version code zero are found (steps 1106, 1108) to be stale. In the manner discussed above, this triggers the configuration manager to send the managed unit all reference characteristics of the subscribed-to profile, which the managed unit proceeds to store in its list 408 (step 1112). The managed unit also updates the corresponding master profile according to the latest version of the reference profile, and stores the new master profile in the list 409 (step 1116). Also, the managed unit updates its subscribed-to profile to bear the up-to-date reference profile's version code (step 1121). Thus, in this embodiment, subscription is incorporated into the existing update process.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. In a multiprocessing system that includes:
   a configuration manager maintaining the following data:
      reference data, comprising:
         a record of reference characteristics;
         a record of reference profiles, each reference profile
            having a name and an associated profile version code, each reference profile identifying one or more constituent reference characteristics; and a subscription list identifying each managed unit subscribing to any of the reference profiles, and in association with each subscribing managed unit, all reference profiles subscribed to and their profile version codes;

multiple managed units, each coupled to the configuration manager, each managed unit maintaining the following data:

a record of one or more operating characteristics;

a record of one or more subscribed-to profiles, each subscribed-to profile comprising a name of a counterpart reference profile maintained by the configuration manager at a past time, and the counterpart reference profile's profile version code; and a profile master view containing master copy counterparts of all reference profiles maintained by the configuration manager at a past time;

where each managed unit functions according to contents of its record of operating characteristics;

a method of comparative update tracking to change local configuration settings at the managed units for synchronization with centrally maintained configuration settings at the configuration manager, comprising operations of:

the configuration manager receiving changes to the reference data;

in response to the changes, determining whether profile version codes of any of the subscribed-to profiles are older than profile version codes of their reference profile counterparts currently being maintained by the configuration manager;

if so, comparing the master copy counterpart of the subscribed-to profile to the reference profile counterpart of the subscribed-to profile as maintained by the configuration manager to identify any differences there between, and in response to finding any new reference characteristics identified by the reference profile counterpart of the subscribed-to profile but not identified by the master copy counterpart of the subscribed-to profile, copying the new reference characteristics to the record of operating characteristics;

in response to finding any updated reference characteristics identified by the reference profile counterpart of the subscribed-to profile where previous versions of the reference characteristic are identified by the master copy counterpart of the subscribed-to-profile, copying the updated reference characteristics to the record of operating characteristics; and in response to finding any omitted reference characteristics not identified by the reference profile counterpart of the subscribed-to profile but identified by the master copy counterpart of the subscribed-to-profile, determining whether any other master copy counterparts of subscribed-to profiles refer to the omitted reference characteristic, and if not, deleting the omitted reference characteristic from the record of operating characteristics.

2. The method of claim 1, the method further comprising:

if profile version codes of any of the subscribed-to profiles are older than profile version codes of their counterpart reference profile counterparts currently being maintained by the configuration manager, changing the older version code of the subscribed-to profile to match the profile version code of its counterpart reference profile currently being maintained by the configuration manager;

changing the version code of the reference profile as listed in the subscription list in association with the managed unit; and updating the master copy counterpart of the subscribed-to profile in the profile master view to replicate the reference profile.

3. The method of claim 2, the updating of the counterpart of the subscribed-to profile in the profile master view comprising copying all reference profiles from the record of reference profiles of the configuration manager into the profile master view.

4. The method of claim 1, further comprising, responsive to profile version codes of any of the subscribed-to profiles being older than profile version codes of their counterpart reference profiles currently being maintained by the configuration manager, the managed unit sending contents of its record of subscribed-to profiles to the configuration manager;

where the comparing comprises:

the configuration manager examining the master copy counterpart of the subscribed-to profile to the reference profile counterpart of the subscribed-to profile as maintained by the configuration manager to identify new reference characteristics listed in the reference profile but not listed in the master copy counterpart; and the configuration manager examining the master copy counterpart of the subscribed-to profile to the reference profile counterpart as maintained by the configuration manager to identify updated reference characteristics listed in the reference profile where previous versions of the reference characteristic are listed in the master copy counterpart.

5. The method of claim 4, where each reference profile includes, in association with each constituent reference characteristic, a characteristic version code comprising the profile version code of the reference profile at a time the constituent reference characteristic was added to the reference profile;

where the identification of updated reference characteristics comprises comparing the each characteristic version code in the reference profile counterpart to the profile version code of the master copy counterpart of the subscribed-to profile.

6. The method of claim 1, further comprising duplicating the reference profiles from the configuration manager at the managed unit;

where the comparing includes the managed unit comparing the master copy counterpart of the subscribed-to profile to the duplicate reference profile counterpart of the subscribed-to profile to identify any omitted reference characteristics not identified by the master copy counterpart of the subscribed-to-profile, and also determining whether any other master copy counterparts of subscribed-to profiles refer to the omitted reference characteristic, and if not, deleting the omitted reference characteristic from the record of operating characteristics.

7. The method of claim 6, further comprising:

replacing contents of the profile master view with the reference profiles duplicated from the configuration manager.

8. The method of claim 1, each profile version code comprising an integer, the method further including incrementing a reference profile's version code each time the reference profile is changed.

9. The method of claim 1, further comprising:
the managed unit receiving a subscription request identifying a desired reference profile;
in response to the subscription request, the managed unit representing the desired reference profile in the record of subscribed-to profiles.

10. The method of claim 9, where the desired reference profile has a name, and where the managed unit representing the desired reference profile in the record of subscribed-to profiles comprises storing the name in the record of subscribed-to profiles in association with a predetermined version code earlier than all previous versions of the desired reference profile.

11. The method of claim 10, the predetermined version code being zero.

12. The method of claim 1, further comprising:
the managed unit receiving operating characteristics from source other than the configuration manager, and in response, storing the received operating characteristics in the record of operating characteristics.

13. A multiprocessing system, comprising:
a configuration manager maintaining the following data:
reference data, comprising:
a record of reference characteristics;
a record of reference profiles, each reference profile having a name and an associated profile version code, each reference profile identifying one or more constituent reference characteristics; and
a subscription list identifying each of the managed units subscribing to any of the reference profiles, and in association with each subscribing managed unit, all reference profiles subscribed to and their profile version codes;
one or more managed units, each coupled to the configuration manager, each managed unit maintaining the following data:
a record of one or more operating characteristics;
a record of one or more subscribed-to profiles, each subscribed-to profile comprising a name of a counterpart reference profile maintained by the configuration manager at a past time, and the counterpart reference profile's profile version code; and
a profile master view containing master copy counterparts of all reference profiles maintained by the configuration manager at a past time;
where each managed unit functions according to contents of its record of operating characteristics;
a communications link coupling the configuration manager to the managed units;
where the configuration manager and managed units are programmed to perform operations of comparative update tracking to synchronize local configuration settings with centrally maintained paradigm settings, the operations comprising:
the configuration manager receiving changes to the reference data;
in response to the changes, determining whether profile version codes of any of the subscribed-to profiles are older than profile version codes of their reference profile counterparts currently being maintained by the configuration manager;
if so, comparing the master copy counterpart of the subscribed-to profile to the reference profile counterpart of the subscribed-to profile as maintained by the configuration manager to identify any differences there between, and
in response to finding any new reference characteristics identified by the reference profile counterpart of the subscribed-to profile but not identified by the master copy counterpart of the subscribed-to profile, copying the new reference characteristics to the record of operating characteristics;
in response to finding any updated reference characteristics identified by the reference profile counterpart of the subscribed-to profile where previous versions of the reference characteristic are identified by the master copy counterpart of the subscribed-to-profile, copying the updated reference characteristics to the record of operating characteristics; and
in response to finding any omitted reference characteristics not identified by the reference profile counterpart of the subscribed-to profile but identified by the master copy counterpart of the subscribed-to-profile, determining whether any other master copy counterparts of subscribed-to profiles refer to the omitted reference characteristic, and if not, deleting the omitted reference characteristic from the record of operating characteristics.

14. The system of claim 13, the configuration manager and managed units being further programmed to perform operations comprising:
if profile version codes of any of the subscribed-to profiles are older than profile version codes of their counterpart reference profile counterparts currently being maintained by the configuration manager,
changing the older version code of the subscribed-to profile to match the profile version code of its counterpart reference profile currently being maintained by the configuration manager;
changing the version code of the reference profile as listed in the subscription list in association with the managed unit; and
updating the master copy counterpart of the subscribed-to profile in the profile master view to replicate the reference profile.

15. The system of claim 14, the configuration manager and managed units being programmed such that the updating of the counterpart of the subscribed-to profile in the profile master view comprises copying all reference profiles from the record of reference profiles of the configuration manager into the profile master view.

16. The system of claim 13,
the configuration manager and managed units being further programmed to perform operations further comprising, responsive to profile version codes of any of the subscribed-to profiles being older than profile version codes of their counterpart reference profiles currently being maintained by the configuration manager, the managed unit sending contents of its record of subscribed-to profiles to the configuration manager;
where the configuration manager and managed units are programmed such that the comparing comprises:
the configuration manager examining the master copy counterpart of the subscribed-to profile to the reference profile counterpart of the subscribed-to profile as maintained by the configuration manager to identify new reference characteristics listed in the reference profile but not listed in the master copy counterpart; and the configuration manager examining the master copy counterpart of the subscribed-to profile to the reference profile counterpart as maintained by the configuration manager to identify updated reference characteristics listed in the reference profile where previous versions of the reference characteristic are listed in the master copy counterpart.

17. The system of claim 16, where each reference profile includes, in association with each constituent reference characteristic, a characteristic version code comprising the profile version code of the reference profile at a time the constituent reference characteristic was added to the reference profile;

where the configuration manager and managed units are programmed such that the identification of updated reference characteristics comprises comparing the each characteristic version code in the reference profile counterpart to the profile version code of the master copy counterpart of the subscribed-to profile.

18. The system of claim 13, the configuration manager and managed units being further programmed to perform operations comprising duplicating the reference profiles from the configuration manager at the managed unit;

where the configuration manager and managed units are programmed such that the comparing includes the managed unit comparing the master copy counterpart of the subscribed-to profile to the duplicate reference profile counterpart of the subscribed-to profile to identify any omitted reference characteristics not identified by the master copy counterpart of the subscribed-to-profile, and also determining whether any other master copy counterparts of subscribed-to profiles refer to the omitted reference characteristic, and if not, deleting the omitted reference characteristic from the record of operating characteristics.

19. The system of claim 18, the configuration manager and managed units being further programmed to perform operations comprising:

replacing contents of the profile master view with the reference profiles copied from the configuration manager.

20. The system of claim 13, each profile version code comprising an integer, the configuration manager and managed units being further programmed to perform operations including incrementing a reference profile's version code each time the reference profile is changed.

21. The system of claim 13, each managed unit being programmed such that the operations further comprise:

the managed unit receiving a subscription request identifying a desired reference profile;

in response to the subscription request, the managed unit representing the desired reference profile in the record of subscribed-to profiles.

22. The system of claim 21, where the desired reference profile has a name, and where each managed unit is programmed such that the operations further comprise the managed unit representing the desired reference profile in the record of subscribed-to profiles comprises storing the name in the record of subscribed-to profiles in association with a predetermined version code earlier than all previous versions of the desired reference profile.

23. The system of claim 22, the predetermined version code being zero.

24. The system of claim 13, each managed unit being programmed such that the operations further comprise:

the managed unit receiving operating characteristics from source other than the configuration manager, and in response, storing the received operating characteristics in the record of operating characteristics.

25. A method for operating a multiprocessing system including a configuration manager and multiple hierarchically inferior managed units, comprising operations of:

the configuration manager maintaining reference compilations of (1) different operating characteristics specifying operating parameters for a managed unit, and (2) different operating profiles, each profile defining a managed unit operating mode by identifying a particular combination of one or more of the operating characteristics;

the managed units subscribing to one or more selected operating profiles, comprising the following operations for each managed unit:

copying each selected operating profile from the configuration manager to local storage of the managed unit;

copying each operating characteristic identified in the selected operating profiles to local storage of the managed unit;

the managed unit conducting operations according to the locally-stored operating characteristics identified in the subscribed-to operating profiles;

on a recurring basis, each managed unit synchronizing its local storage with the reference compilation of the configuration manager, comprising:

identifying any locally stored operating profiles that are stale relative to changed counterparts in the reference compilation;

for each stale operating profile, comparing the stale operating profile to its counterpart in the reference compilation to identify any (1) updated operating characteristics listed in the counterpart profile that have been updated relative to earlier versions of the operating characteristics in the stale profile, (2) new operating characteristics listed in the counterpart profile that do not appear in the stale profile, and (3) deleted operating characteristics that are absent from the counterpart profile yet present in the stale profile;

updating the operating characteristics in local storage by adding any identified updated operating characteristics, adding any identified new operating characteristics, and deleting any identified absent operating characteristics;

updating each stale operating profile in local storage according to its counterpart at the configuration manager; and the managed unit conducting operations according to the updated locally-stored operating characteristics identified in the updated subscribed-to operating profiles.

* * * * *

UNITED STATES PATENT AND TRADEMARK OFFICE
CERTIFICATE OF CORRECTION

PATENT NO. : 6,167,408
DATED : December 26, 2000
INVENTOR(S) : Cannon et al.

Page 1 of 1

It is certified that error appears in the above-identified patent and that said Letters Patent is hereby corrected as shown below:

Title page,
Change "UPDATES" to -- UPDATE --

Column 2,
Line 46, change "subscribed-o" to -- subscribed-to --

Column 7,
Table 2, approx. line 15, change "Address=9.115.12.92 Port=1500" to
-- Address=9.115.12.92, Port=1500 --

Column 12,
Lines 24-25, between "input," and "rather" delete "5"

Claim 6, column 20,
Line 58, change "subscribed-to-profile" to -- subscribe-to profile --

Claim 13, column 22,
Line 14, change "subscribed-to-profile" to -- subscribe-to profile --

Claim 13, column 22,
Line 21, change "subscribed-to-profile" to -- subscribe-to profile --

Claim 18, column 23,
Line 32, change "subscribed-to-profile" to -- subscribe-to profile --

Signed and Sealed this

Thirtieth Day of October, 2001

*Attest:*

Nicholas P. Godici

NICHOLAS P. GODICI
*Attesting Officer*    *Acting Director of the United States Patent and Trademark Office*